(12) United States Patent
Umezu et al.

(10) Patent No.: US 6,567,742 B2
(45) Date of Patent: May 20, 2003

(54) ON-BOARD NAVIGATION TERMINAL AND NAVIGATION CONTROLLER

(75) Inventors: Masaharu Umezu, Tokyo (JP); Tomoya Ikeuchi, Tokyo (JP); Makoto Mikuriya, Tokyo (JP); Mitsuo Shimotani, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/050,860

(22) Filed: Jan. 18, 2002

(65) Prior Publication Data

US 2002/0165663 A1 Nov. 7, 2002

(30) Foreign Application Priority Data

May 2, 2001 (JP) ......................................... 2001-135469

(51) Int. Cl.⁷ ............................................... G01C 21/00
(52) U.S. Cl. ......................................... 701/208; 701/24
(58) Field of Search ................................. 701/208, 202, 701/201, 24, 25; 73/178 R

(56) References Cited

U.S. PATENT DOCUMENTS 5,765,723 A  *  6/1998  Nimura et al. .............. 701/208

FOREIGN PATENT DOCUMENTS

JP         4-46379        2/1992

* cited by examiner

Primary Examiner—Yonel Beaulieu
(74) Attorney, Agent, or Firm—Leydig, Voit & Mayer, Ltd.

(57) ABSTRACT

An on-board navigation terminal includes a received data memory for storing received data concerning a navigating application received from a center system, based on a profile transmitted to the center system; and navigating application available data generating unit for generating available data based on map data stored in a map data memory, and the received data stored in the received data memory.

19 Claims, 17 Drawing Sheets

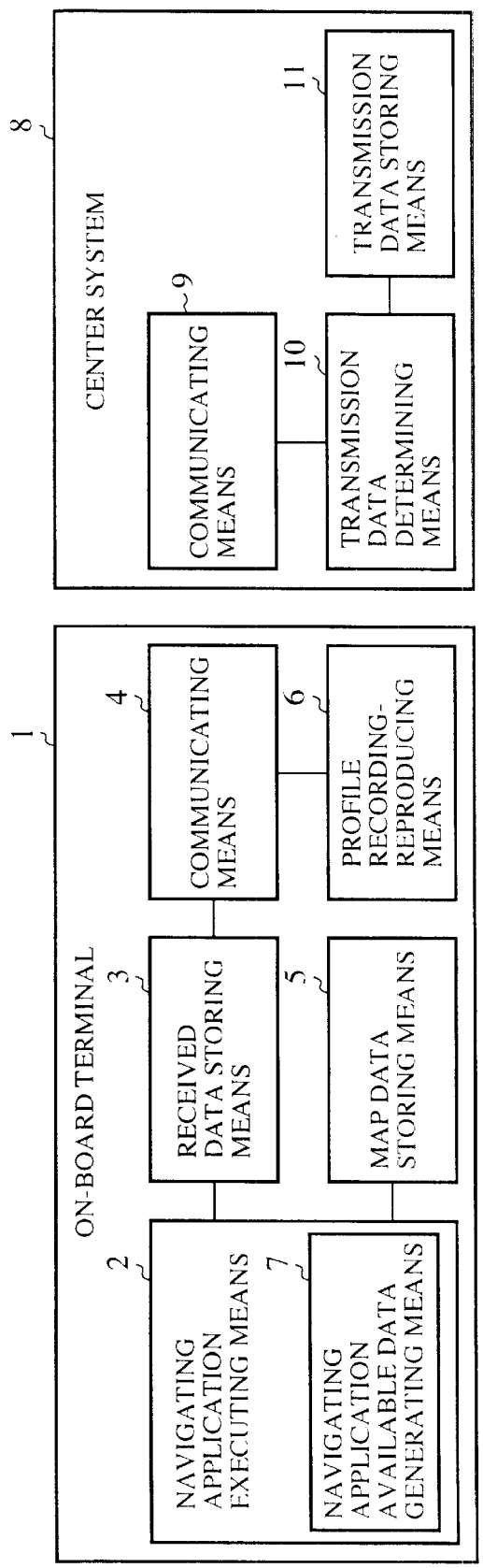

FIG.2

| INFORMATION CATEGORY | CONTENT |
|---|---|
| 21 — PERSONAL INFORMATION | NAME: |
| | SEX: |
| | BLOOD TYPE: |
| | ADDRESS: |
| | ⋮ |
| 22 — VEHICLE INFORMATION (STATIC INFORMATION) | REGISTRATION NUMBER: |
| | VEHICLE TYPE: |
| | MODEL: |
| | ⋮ |
| 23 — VEHICLE INFORMATION (DYNAMIC INFORMATION) | TRAVELING DISTANCE: |
| | TRAVELING HISTORY: |
| | ⋮ |
| 24 — TERMINAL INFORMATION | TERMINAL NAME: |
| | SCREEN SIZE: |
| | CPU: |
| | MEMORY: |
| | ⋮ |
| 25 — SERVICE INFORMATION | CATEGORY OF BUSINESS: |
| | SUBSTANCE OF DUTIES AND RESPONSIBILITIES: |
| | ⋮ |
| 26 — OPERATION HISTORY INFORMATION | DATA VERSION: |
| | MENU ITEM: |
| | SERVICE AREA: |
| | ⋮ |

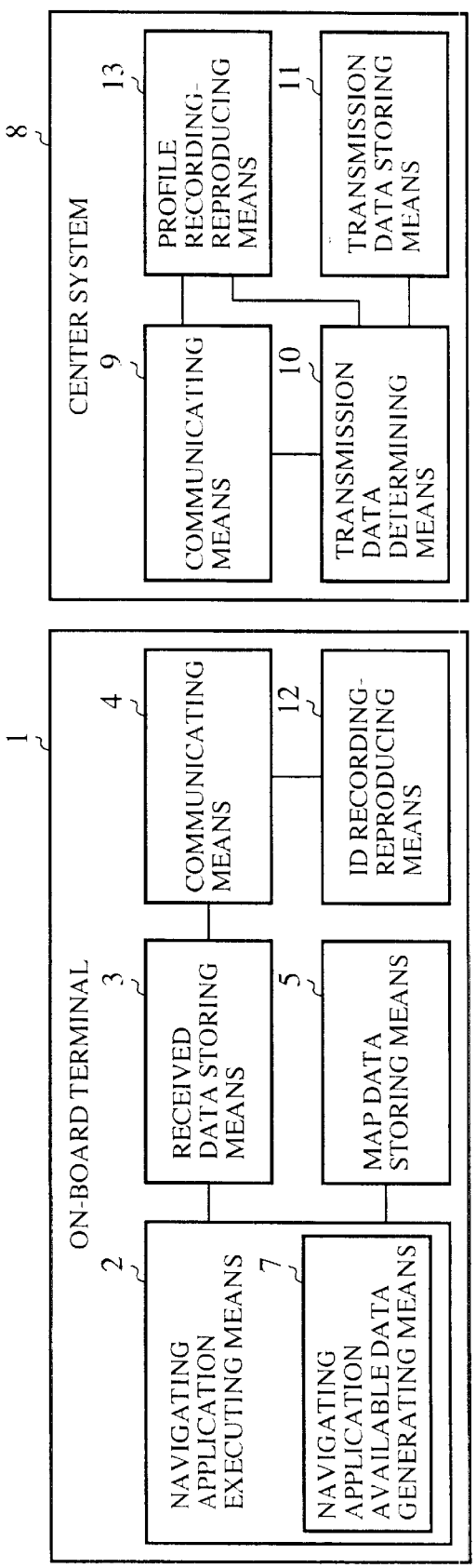

ON-BOARD NAVIGATION TERMINAL AND NAVIGATION CONTROLLER

BACKGROUND OF THE INVENTION

1. Field of the Invention

This invention relates to an on-board navigation terminal, and a navigation controller.

2. Description of the Related Art

A conventional on-board navigation terminal has been designed to receive road map information from a center system as a navigation controller, to store the received read data information in storing means such as a memory or the like, and to execute a navigating application by reading the stored road map information at the right time. At the center system, the road map information to be managed is updated as needed. Thus, the on-board navigation terminal periodically receives the road map information from the center system, or receives the road map information on a demand basis, and then updates the stored road map information.

Such a configuration of the conventional on-board navigation terminal sometimes defers awareness that the state of the road map information is not yet updated after its reception from the center system, or that the update of the received road map information is unnecessary. This results in vast amount of transmission time and costs. Further, this leads to a tremendous amount of data being held in the on-board navigation terminal, and so on.

SUMMARY OF THE INVENTION

The present invention has been made to solve the foregoing problems. It is an object of the present invention to provide an on-board navigation terminal capable of shortening communication time, and reducing communication costs and the quantity of data held in the on-board navigation terminal side by transferring only necessary relevant information between the transmitting and receiving sides which are responsible for transmission and reception of the relevant information concerning a navigating application. Another object is to provide a navigation controller.

According to an aspect of the invention, there is provided an on-board navigation terminal, comprising map data storing means for storing map data; communicating means for performing communications with an external navigation controller; received data storing means for storing received data containing relevant information concerning a navigating application transmitted from the navigation controller and received through the communicating means, based on unique information transmitted through the communicating means to the navigation controller; and data generating means for generating available data based on the map data stored in the map data storing means and the received data stored in the received data storing means.

According to the on-board navigation terminal of the invention, unique information recording-reproducing means is provided for recording or reproducing unique information specifying a content of the relevant information transmitted from the navigation controller.

According to the on-board navigation terminal of the invention, unique information recording-changing means is provided for changing the unique information recorded by the unique information recording-reproducing means depending on what kind of change is made therein.

According to the on-board navigation terminal of the invention, the unique information recording-changing means changes personal information of a user using the navigating application.

According to the on-board navigation terminal of the invention, the unique information recording-changing means changes vehicle information unique to a vehicle.

According to the on-board navigation terminal of the invention, the unique information recording-changing means changes terminal information indicative of a type of the terminal itself.

According to the on-board navigation terminal of the invention, the unique information recording-changing means changes service information concerning a service of the application for application.

According to the on-board navigation terminal of the invention, automatic unique information updating means is provided for automatically updating the unique information recorded by the unique information recording-reproducing means.

According to the on-board navigation terminal of the invention, the automatic unique information updating means updates vehicle information indicative of a traveling state of a vehicle.

According to the on-board navigation terminal of the invention, the automatic unique information updating means updates operation history information indicative of an operation history of the on-board navigation terminal.

According to another aspect of the invention, there is provided an on-board navigation terminal, comprising map data storing means for storing map data; communicating means for performing communications with an external navigation controller; identification information recording-reproducing means for recording or reproducing identification information for identifying unique information recorded or reproduced by unique information recording-reproducing means provided in the navigation controller; received data storing means for receiving received data from the navigation controller, containing relevant information concerning a content specified by the unique information which is identified based on the identification information reproduced by the identification information recording-reproducing means and transmitted through communicating means to the navigation controller, and for storing the received data; and data generating means for generating available data based on the map data stored in the map data storing means, and the received data stored in the received data storing means.

According to the on-board navigation terminal of the invention, the received data storing means stores received data containing, as relevant information, difference information indicative of a difference between a conventional map and a newly changed latest map.

According to the on-board navigation terminal of the invention, the received data storing means stores received data containing specific relevant information corresponding to the unique information.

According to the on-board navigation terminal of the invention, the received data storing means stores received data containing, as relevant information, additional information added to a navigating application.

According to the on-board navigation terminal of the invention, charging means is provided for receiving or transmitting charging information concerning a service rendered from the navigation controller through the communicating means.

According to the on-board navigation terminal of the invention, the charging means is provided with prepaid card driving means for driving a loaded prepaid card.

According to yet another aspect of the invention, there is provided a navigation controller, comprising communicating means for performing communications with an external on-board navigation terminal; transmission data storing means for storing a plurality of transmission data containing a plurality of relevant information concerning a navigating application utilized in the on-board navigation terminal; and transmission data determining means for determining transmission data containing relevant information corresponding to unique information, among the plurality of transmission data stored in the transmission data storing means, when the unique information or identification information specifying the unique data is received though the communicating means from the on-board navigation terminal, and for transmitting the determined transmission data to the on-board navigation terminal through the communicating means.

According to the navigation controller of the invention, unique information recording-reproducing means is provided for recording or reproducing the unique information specifying the content of the relevant information.

According to the navigation controller of the invention, unique information recording-changing means is provided for changing the unique information recorded by the unique information recording-reproducing means depending on what kind of change is made therein.

According to the navigation controller of the invention, the unique information recording-changing means changes personal information of a user corresponding to received identification information.

According to the navigation controller of the invention, the unique information recording-changing means changes vehicle information unique to a vehicle on which an on-board navigation terminal corresponding to received identification information is mounted.

According to the navigation controller of the invention, the unique information recording-changing means changes terminal information indicative of types of a plurality of on-board navigation terminals.

According to the navigation controller of the invention, the unique information recording-changing means changes service information concerning a plurality of services offered by the navigating application.

According to the navigation controller of the invention, change detecting means for detecting information changed with an elapse of time in the on-board navigation terminal side at every fixed time, and automatic unique information updating means is provided for automatically updating the unique information recorded by the unique information recording-reproducing means depending on the change detected by the change detecting means.

According to the navigation controller of the invention, the automatic unique information updating means updates vehicle information indicative of a traveling state of a vehicle on which an on-board navigation terminal mounted corresponding to received identification information is mounted.

According to the navigation controller of the invention, the automatic unique information updating means updates operation history information indicative of an operation history of an on-board navigation terminal corresponding to received identification information.

According to the navigation controller of the invention, the transmission data storing means stores transmission data containing, as relevant information, difference information indicative of a difference between a conventional map and a newly changed latest map.

According to the navigation controller of the invention, the transmission data storing means stores transmission data containing specific relevant information corresponding to the unique information.

According to the navigation controller of the invention, the transmission data storing means stores transmission data containing, as relevant information, additional information added to the navigating application.

According to the navigation controller of the invention, charging means is provided for transmitting or receiving charging information concerning a service rendered to the on-board navigation terminal through the communicating means.

According to the navigation controller of the invention, the charging means does not make a charge till a predetermined condition is met from a start of the service rendered to the on-board navigation terminal.

The above and other objects and the attendant advantages of the invention will become readily apparent by referring to the following detailed description when considered in conjunction with the accompanying drawings.

BRIEF DESCRIPTION OF THE DRAWINGS

FIG. 1 is a block diagram showing a configuration of a navigation system according to a first embodiment of the invention.

FIG. 2 is a table showing an example of profiles of the first embodiment.

FIG. 8 is a block diagram showing a configuration of a navigation system according to a second embodiment of the invention.

Throughout the figures, the same reference numerals, and characters, unless otherwise noted, are used to denote like features, elements, components, or portions of the illustrated embodiment.

DETAILED DESCRIPTION OF THE PREFERRED EMBODIMENTS

Figure 3:
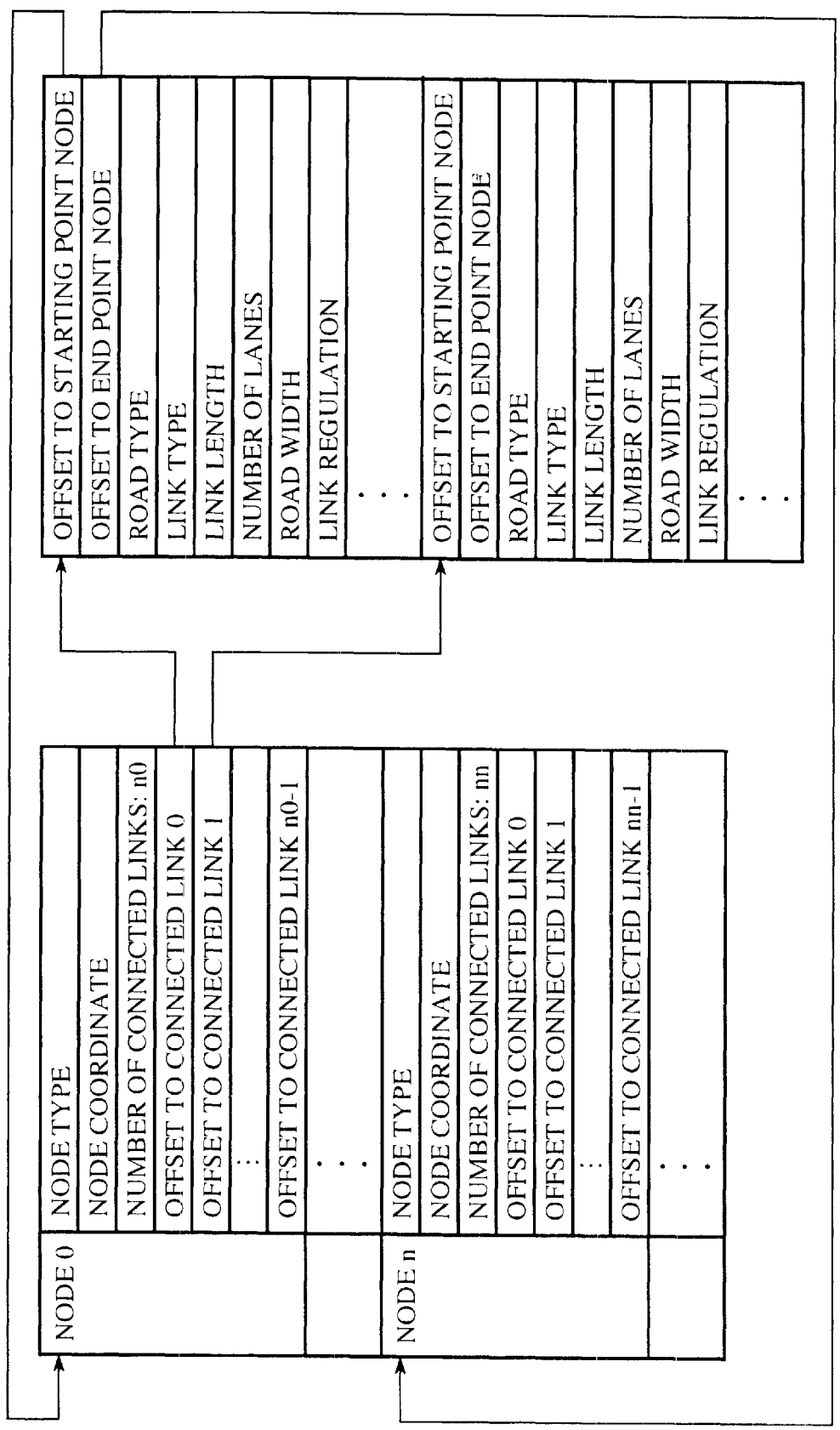
FIG. 3 is an explanatory drawing showing an example of map data stored in map data storing means in FIG. 1.

The preferred embodiments of the present invention will be described in detail, referring to the accompanying drawings.

First Embodiment

FIG. 1 is a block diagram showing the configuration of a navigation system according to the first embodiment of the invention. In FIG. 1, a reference numeral 1 denotes an on-board navigation terminal mounted on a vehicle (hereinafter referred to as an "on-board terminal"); 2 navigating application executing means for executing a navigating application; 3 received data storing means for storing received data; 4 communicating means for performing communications; 5 map data storing means for storing map data; 6 profile recording-reproducing means (unique information recording-reproducing means) for recording or reproducing a profile (unique information) concerning the map data; 7 navigating application available data generating means (data generating means) for generating data used for a navigating application in the navigating application executing means 2; 8 a center system (navigation controller) for supplying relevant information concerning the navigating application to the on-board terminal 1; 9 communicating means for performing communications; 10 transmission data determining means for determining transmission data; and 11 transmission data storing means for storing a plurality of transmission data containing a plurality of relevant information. Here, a CPU for controlling the entire system, a display for displaying a map, a plurality of operation switches, and so on, are provided in the on-board terminal, but these portions are not shown, and description thereof will be omitted for brevity sake.

Next, the operation of the first embodiment will be described.

The on-board terminal 1 transmits a profile reproduced by the profile recording-reproducing means 6 to the center system 8 through the communicating means 4.

FIG. 2 is a table showing an example of profiles of the first embodiment. In FIG. 2 the table contains an unique information category indicative of relevant information concerning a navigating application, and categories of the unique information and various information fallen under these categories. The unique information category includes user personal information 21 containing a name, sex, a blood type, an address, and so on-board information 22 as static information unique to a vehicle, containing a registration number, a vehicle type, a model, and so on-board information 23, as dynamic information indicative of a traveling state, containing a traveling distance, traveling history, and so on; terminal information 24 of the terminal itself containing a terminal name, a screen size, a CPU, a memory, and so on; service information 25 containing a category of business, substance of duties and responsibilities, and so on; and operation history information 26 of the operation history of the on-board terminal 1 containing a data version, a menu item, a service area, and so on.

In the center system 8, by using the profile received through the communication means 9, the transmission data determining means 10 determines transmission data containing relevant information to be transmitted, among a plurality of transmission data corresponding to a plurality of relevant information stored in the transmission data storing means 11, and then transmits the determined transmission data to the on-board terminal 1 through the communicating means 9. The on-board terminal 1 receives the transmission data sent from the center system 8 through the communicating means 4, and records the received transmission data in the received data storing means 3. Accordingly, the received data that has been recorded contains the relevant information corresponding to the transmitted profile. Communications between the on-board terminal 1 and the center system 8 are carried out by radio, e.g., by a portable telephone set, a DSRC or the like.

The navigating application executing means 2 generates available data used for the navigating application using the navigating application available data generating means 7 based on map data stored in the map data storing means 5, i.e., on-board terminal side data, and received data (specifically, relevant information contained in the received data) recorded by the received data storing means 3, and performs various navigating operations.

FIG. 3 is an explanatory drawings showing an example of map data stored in the map data storing means 5 in FIG. 1, which contains data indicative of various attributes and connections of a node indicative of a point of intersection and a link indicative of a road.

FIGS. 4(a) to 4(d) are explanatory drawings, each showing an example of generation of available data used for a navigating application based on the map data according to the first embodiment.

Figure 4A:
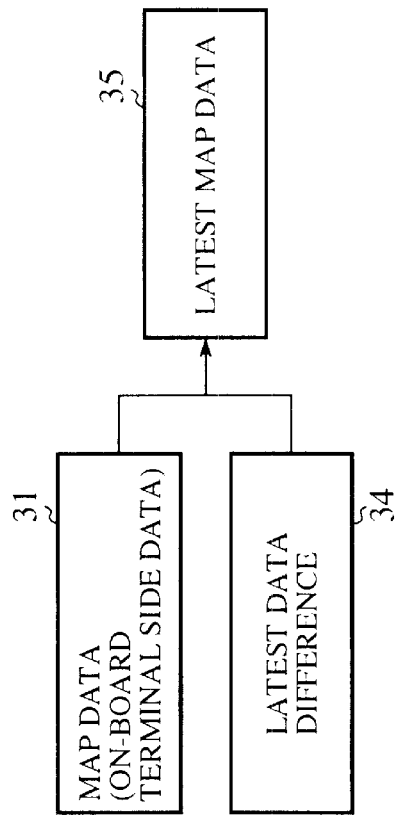
FIGS. 4(a) to 4(d) are explanatory drawings, each showing an example of generation of available data used for a navigating application based on the map data according to the first embodiment.
Figure 4B:
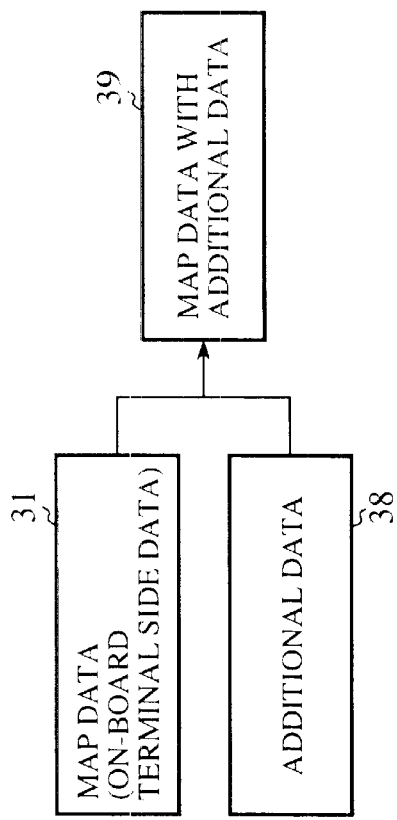
Figure 4C:
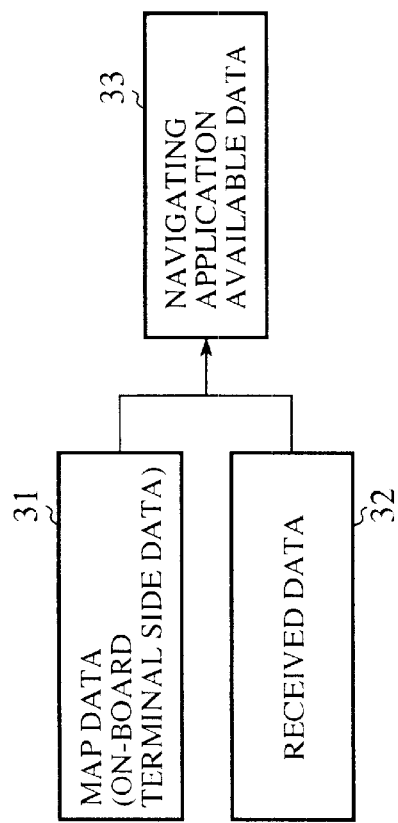

As shown in FIG. 4(a), the navigating application available data generating means 7 generates navigating application available data 33 from map data (on-board terminal side data) 31, and received data 32. If the received data 32 contains the latest difference data (difference information) indicative of a difference between a conventional map and a newly changed latest map, as relevant information concerning the navigating application, then latest map data 35 is generated from the map data 31 and the latest difference data 34 as shown in FIG. 4(b). If the received data 32 contains customized data as relevant information, then customized map data 37 is generated from the map data 31 and customized data 36 as shown in FIG. 4(c).

Figure 4D:
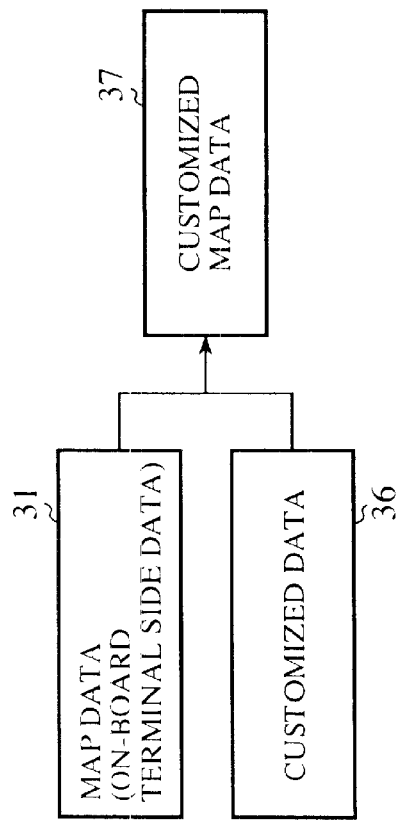

As the customized data 36, there can be service information obtained by customizing regulation information so as to take only a trunk road as a route in a distribution field or the like, personal information containing a specific street which is selected by individual preference, and is displayed just like a trunk road, and so on. If the received data 32 contains map data with additional data as relevant information, then map data 39 with additional data is generated from the map data 31 and additional data 38 as shown in FIG. 4(d). As the additional data 38, there can be various facility data corresponding to a coordinate on the map data, sightseeing route data containing a plurality of facility data, a route among the plurality of data, and so on.

Figure 5A:
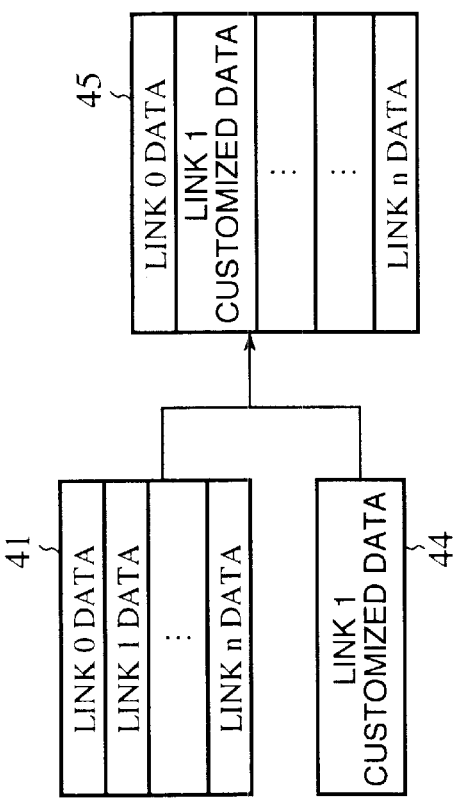
FIGS. 5(a) to 5(c) are explanatory drawings, each showing an example of generation of specific available data used for a navigating application according to the first embodiment.
Figure 5B:
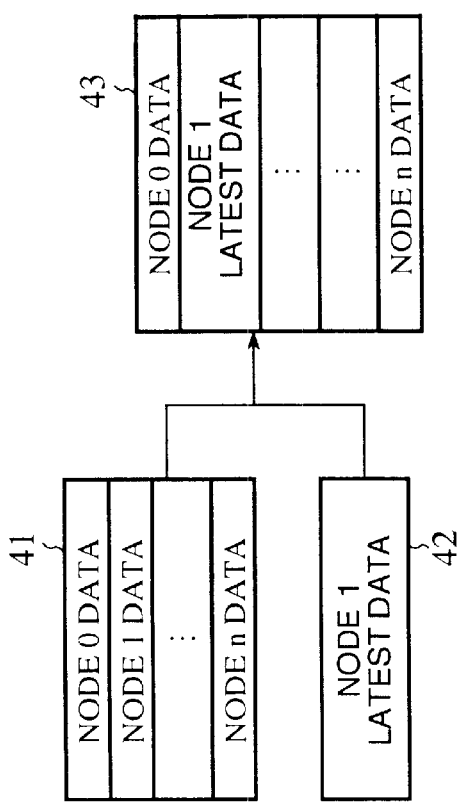
Figure 5C:
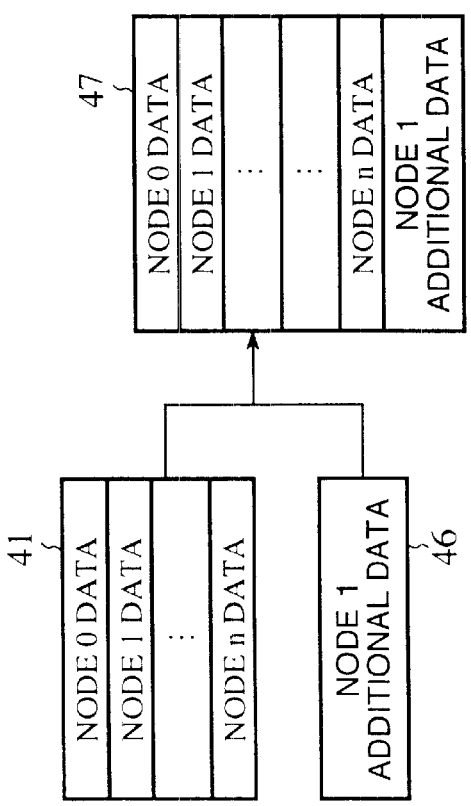

FIGS. 5(a) to 5(c) are explanatory drawings, each showing an example of generation of data used for navigating application according to the first embodiment. These figures show more specific examples of navigating application data. In FIG. 5(a), map data 43 which takes the data of node 1 as the latest data is generated based on map data 41, and the received latest data 42 of node 1 (relevant information) received as the latest difference map data. In FIG. 5(b), customized map data 45 in which data of a link 1 is customized is generated from the map data 41, and customized data 44 of link 1 (relevant information) received as customized data. In FIG. 5(c), map data 47 with additional data of node 1 is generated from the map data 41, and additional data 46 of node 1 (relevant information) received as additional data.

Figure 6A:
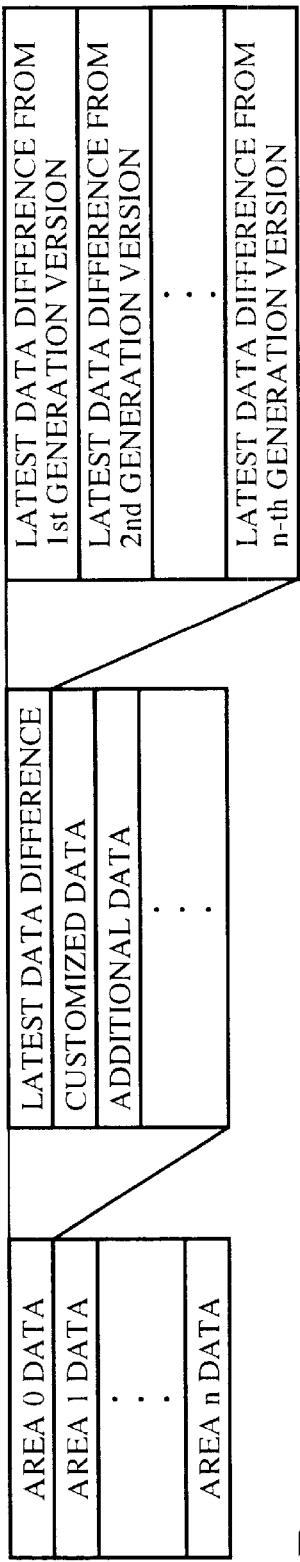
FIGS. 6(a) to 6(c) are explanatory drawings, each showing an example of transmission data stored in transmission data storing means of a center system in FIG. 1.
Figure 6B:
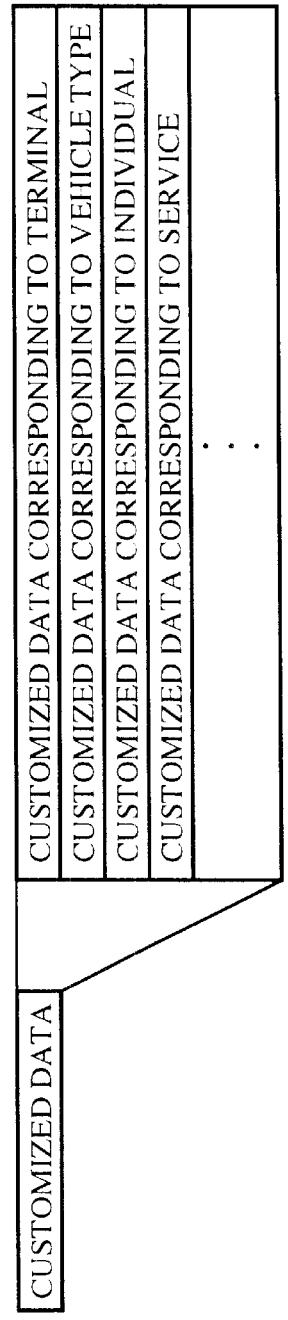
Figure 6C:
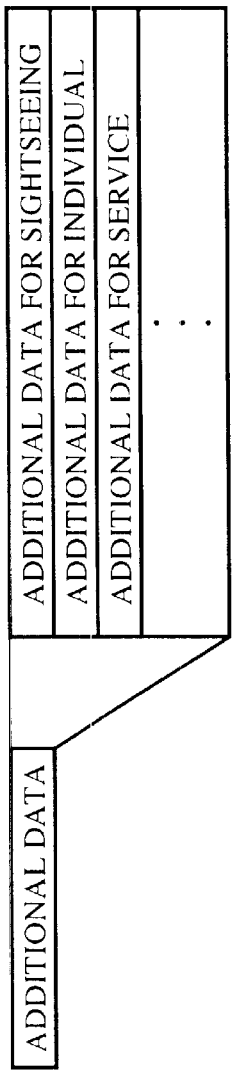

FIGS. 6(a) to 6(c) are explanatory drawings, each showing an example of transmission data stored in the transmission data storing means 11 of the center system 8 in FIG. 1. In FIG. 6(a), relevant information concerning the navigating application, such as the latest difference data, customized data, additional data and the like, is stored in each plural areas, and the latest differences data of plural versions (1st, 2nd , , , n-th generation) are stored as the latest difference data. In FIG. 6(b), the structure of the customized data in FIG. 6(a) is shown, which contains customized data corresponding to a terminal, a vehicle type, an individual, a category of business, and so on. In FIG. 6(c), the structure of the additional data in FIG. 6(a) is shown, which contains additional data for sightseeing, individual use, a category of business, and so on.

Figures 7A, 7B, 7C:
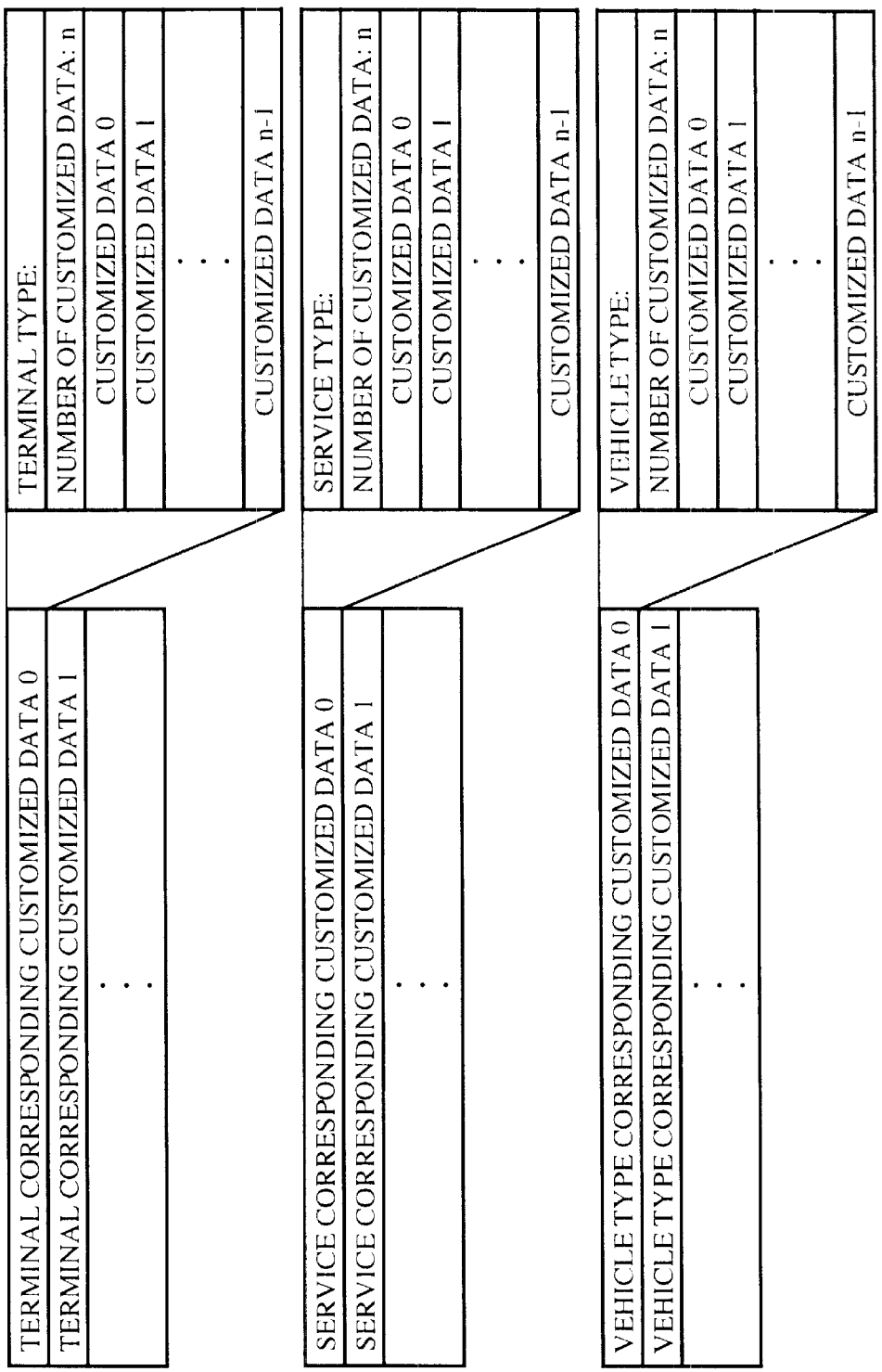
FIGS. 7(a) to 7(c) are explanatory drawings, each showing a specific example of customized data of each in FIGS. 6(a) to 6(c).

FIGS. 7(a) to 7(c) are explanatory drawings, each showing a specific example of the customized data in FIGS. 6(a) to 6(c). Specifically, FIG. 7(a) shows the structure of the customized data corresponding to a terminal; FIG. 7(b) the structure of the customized data corresponding to a service; and FIG. 7(c) the structure of the customized data corresponding to a vehicle type, i.e., vehicle information.

The transmission data determining means 10 of the center system 8 determines data among those shown in FIGS. 6(a) to 6(c) and FIGS. 7(a) to 7(c) based on the received profile. For example, if the profile indicates a terminal type AA, the transmission data determining means 10 determines, as transmission data, customized data corresponding to the terminal corresponding to the terminal type AA among the customized data corresponding to the terminal, and then transmits the determined customized data to the on-board terminal 1 through the communicating means 9.

As mentioned above, according to the first embodiment, by transmitting or receiving only the necessary relevant information between the transmitting and receiving sides for transmitting or receiving the relevant information concerning the navigating application, it is possible to shorten communication time, and reduce communication costs and the quantity of data held in the on-board terminal side.

Further, according to the first embodiment, the profile specifying the relevant information stored in the center system 8 is recorded by the profile recording-reproducing means 6 of the on-board terminal 1. Thus, the on-board navigation terminal 1 can easily obtain the specified relevant information only by transmitting the profile to the center system 8.

Further, according to the first embodiment, since the necessary relevant information is difference information indicative of a difference between the conventional map and the newly changed latest map, it is not necessary to transmit or receive all the latest map data consisting of an enormous quantity of data. Thus, it is possible to shorten communication time, and reduce communication costs and quantity of data held in the on-board terminal side.

Furthermore, according to the first embodiment, since the necessary relevant information is one corresponding to the unique information of the on-board navigation terminal side, it is not necessary to transmit or receive any wasteful relevant information, which is never used. Thus, it is possible to shorten communication time, and reduce communication costs, and the quantity of data held in the on-board terminal side to a minimum.

Moreover, according to the first embodiment, the necessary relevant information is additional information added to the navigating application. Thus, it is possible to shorten communication time, reduce communication costs and the quantity of data held in the on-board terminal side, and enhance applicability of application.

Second Embodiment

FIG. 8 is a block diagram showing the configuration of a navigation system according to the second embodiment of the invention. In FIG. 8, a reference numeral 12 denotes ID recording-reproducing means (identification information recording-reproducing means) for recording or reproducing ID (identification information); and 13 profile recording-reproducing means for recording or reproducing a profile. Other components that are the same as those of the first embodiment described above with reference to FIG. 1, are denoted by the same reference numerals, and thus description thereof will be omitted.

Next, the operation of the second embodiment will be described.

The on-board terminal 1 transmits reproduced ID from the ID recording-reproducing means 12 to the center system 8 through the communicating means 4. The profile recording-reproducing means 13 of the center system 8 reproduces a profile corresponding to the ID received through the communication means 9, and sends it to the transmission data determining means 10.

Figure 9:
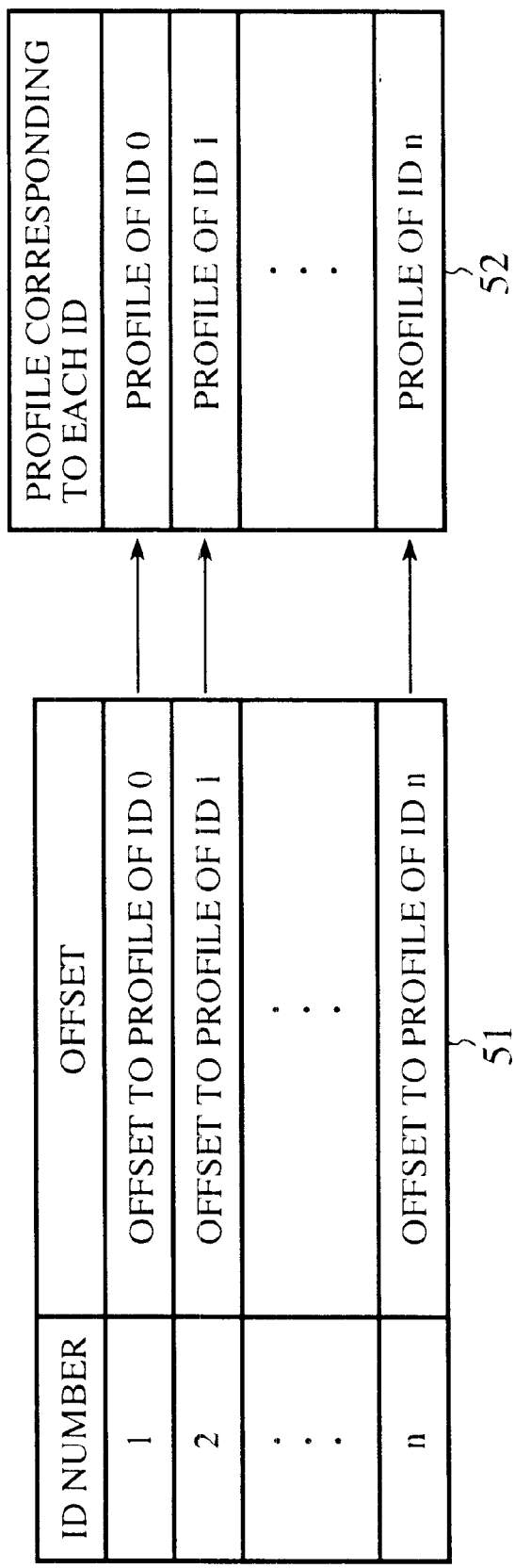
FIG. 9 is a table showing a relationship between IDs recorded or reproduced by an ID recording-reproducing means and profiles recorded or reproduced by a profile recording-reproducing means according to the second embodiment of the invention.

FIG. 9 is a table showing a relationship between the IDs recorded or reproduced by the ID recording-reproducing means 13 and profiles recorded or reproduced by the profile recording-reproducing means 12 according to the second embodiment of the present invention. The transmission data determining means 10 determines transmission data containing relevant information specified by each profile, among a plurality of transmission data stored in the transmission data storing means 11, and then transmits the determined transmission data to the on-board navigation terminal 1 through the communicating means 9.

As mentioned above, according to the second embodiment, the on-board navigation terminal 1 transmits ID consisting of a very few data to the center system 8. Thus, it is possible to easily and quickly obtain specified relevant information.

Further, according to the second embodiment, profiles for a plurality of users are stored in the profile recording-reproducing means 13. Thus, it is possible to make effective use of system resources, and reduce the quantity of data in the on-board navigation terminal side by centrally managing profiles of the plurality of users.

Third Embodiment

Figure 10:
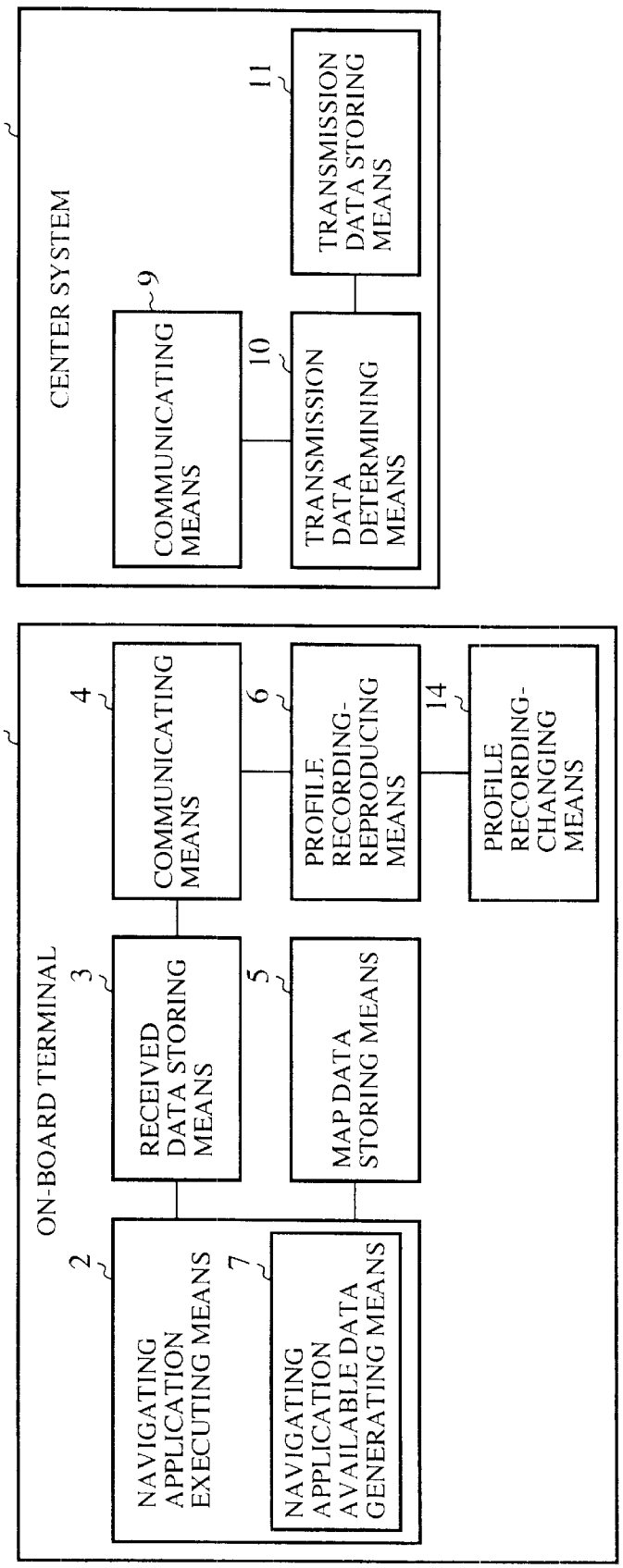
FIG. 10 is a block diagram showing a configuration of a navigation system according to a third embodiment of the invention.

FIG. 10 is a block diagram showing the configuration of a navigation system according to the third embodiment of the invention. In FIG. 10, a reference numeral 14 denotes profile recording changing means (unique information recording changing means) provided in the on-board terminal 1. Other components that are the same as those of the first embodiment described above with reference to FIG. 1, are denoted by the same reference numerals, and thus description thereof will be omitted.

Next, the operation of the third embodiment will be described.

The profile recording-changing means 14 changes unique information recorded by the profile recording-reproducing means 6 depending on what kind of change is made therein. Unique information to be changed may be one selected from personal information, static vehicle information, terminal information, service information, and so on, like those shown in FIG. 2.

As mentioned above, according to the third embodiment, when any change is made in the unique information, it is possible to easily change personal information recorded by the profile recording-reproducing means 6 depending on what kind of change is made therein.

In other words, according to the third embodiment, when any change is made in personal information such as user's address or the like, the personal information recorded by the profile recording-reproducing means 6 can be easily changed depending on what kind of change is made therein.

According to the third embodiment, when any change is made in a registration number or a vehicle type unique to the vehicle, it is possible to easily change static vehicle information recorded by the profile recording-reproducing means 6 depending on what kind of change is made therein.

According to the third embodiment, when any change is made in terminal information, e.g., when the display replacement of the on-board terminal 1 requires a change of a screen size, a CPU or the like, it is possible to easily change terminal information recorded by the profile recording-reproducing means 6 depending on what kind of change is made therein.

Further, according to the third embodiment, when any change is made in service information such as a category of business, substance of duties and responsibilities or the like, it is possible to easily change service information recorded by the profile recording-reproducing means 6 depending on what kind of change is made therein.

Fourth Embodiment

Figure 11:
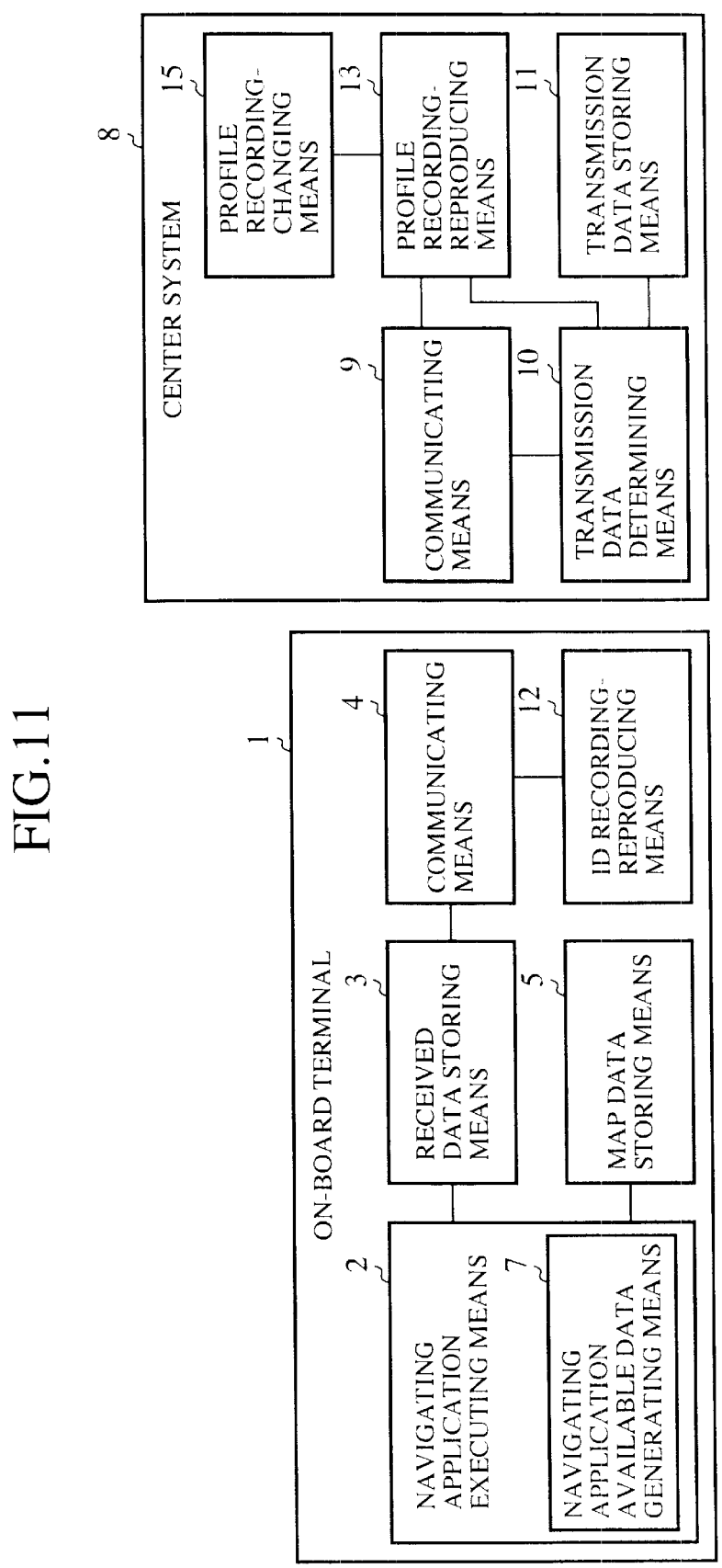
FIG. 11 is a block diagram showing a configuration of a navigation system according to a fourth embodiment of the invention.

FIG. 11 is a block diagram showing the configuration of a navigation system according to the fourth embodiment of the invention. In FIG. 11, a reference numeral 15 denotes profile recording-changing means (unique information recording changing means) provided in the center system 8. Other components that are the same as those of the second embodiment described above with reference to FIG. 8, are denoted by the same reference numerals, and thus description thereof will be omitted.

Next, the operation of the fourth embodiment will be described.

The profile recording-changing means 15 changes unique information recorded by the profile recording-reproducing means 13 depending on what kind of change is made therein. Unique information to be changed may be one selected from personal information, static vehicle information, terminal information, service information, and so on, like those shown in FIG. 2.

As mentioned above, according to the fourth embodiment, when any notification of change is given in unique information, it is possible to easily change personal information recorded by the unique information recording-reproducing means depending on what kind of change is made therein.

In other words, according to the fourth embodiment, when any notification of change is given in personal information such as use's address or the like (by communications or a document), the personal information recorded by the profile recording-reproducing means 13 can be easily changed what kind of change is made therein.

According to the fourth embodiment, when any notification of change is given in a registration number or a vehicle type unique to the vehicle, it is possible to easily change static vehicle information recorded by the profile recording-reproducing means 13 what kind of change is made therein.

According to the fourth embodiment, when any notification of change is given in terminal information, e.g., when the display replacement of the on-board terminal 1 requires a change of a screen size, a CPU or the like, it is possible to easily change terminal information recorded by the profile recording-reproducing means 13 what kind of change is made therein.

Further, according to the fourth embodiment, when any notification of change is given in service information such as a category of business, a substance of duties and responsibilities or the like, it is possible to easily change service information recorded by the profile recording-reproducing means 13 depending on what kind of change is made therein.

Fifth Embodiment

Figure 12:
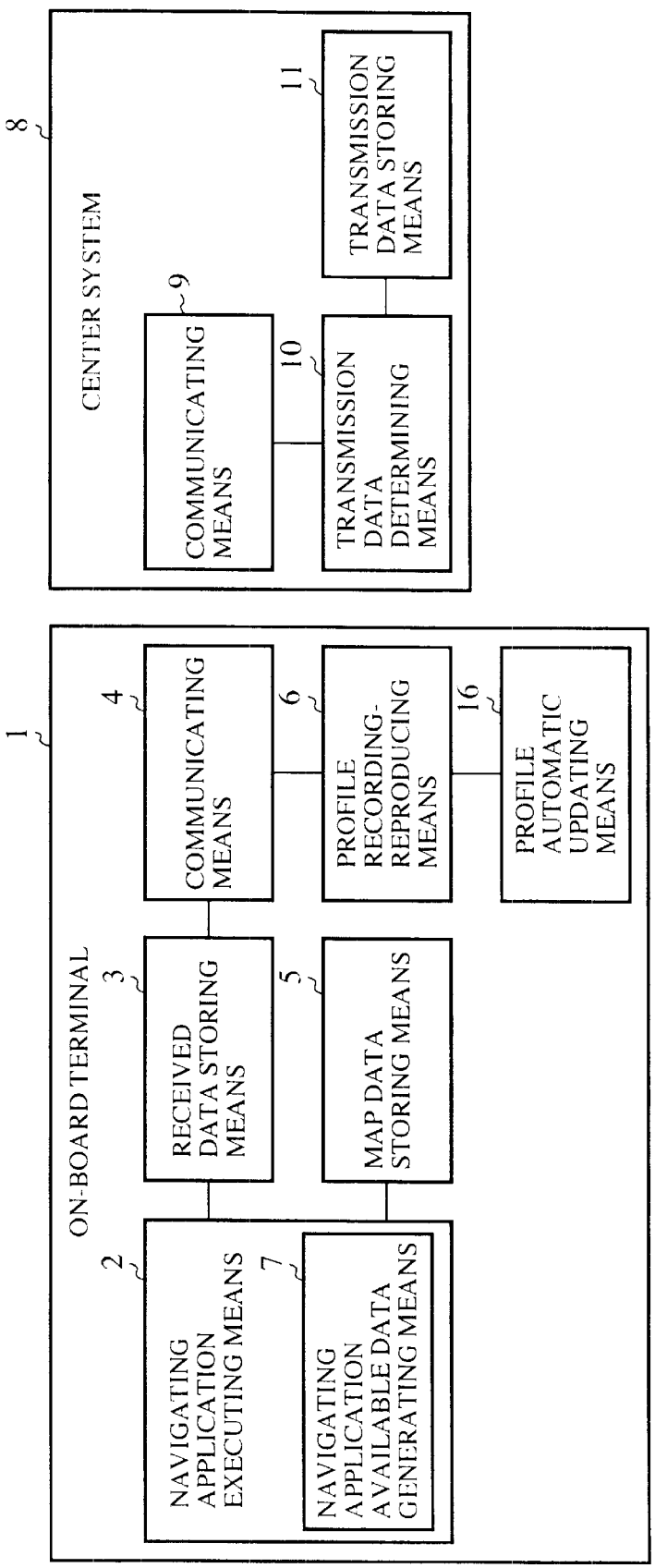
FIG. 12 is a block diagram showing a configuration of a navigation system according to a fifth embodiment of the invention.

FIG. 12 is a block diagram showing the configuration of a navigation system according to the fifth embodiment of the invention. In FIG. 12, a reference numeral 16 denotes automatic profile updating means (automatic unique information updating means) provided in the on-board terminal 1. Other components that are the same as those of the first embodiment described above with reference to FIG. 1, are denoted by the same reference numerals, and thus description thereof will be omitted.

Next, the operation of the fifth embodiment will be described.

The automatic profile updating means 16 detects unique information changed with an elapse of time, and automatically updates unique information recorded by the profile recording-reproducing means 6 depending on what kind of result is obtained. Unique information to be updated may be one selected from dynamic vehicle information, operation history, and so on, like those shown in FIG. 2.

As mentioned above, according to the fifth embodiment, when unique information is changed with an elapse of time, it is possible to automatically update dynamic vehicle information recorded by the profile recording-reproducing means 6.

In other words, according to the fifth embodiment, when any change is made in a vehicle traveling distance or traveling history, dynamic vehicle information recorded by the profile recording-reproducing means 6 at every fixed time can be automatically updated, for example.

Further, according to the fifth embodiment, when the operation history of the on-board terminal 1 is changed, it is possible to automatically update, operation history information recorded by the profile recording-reproducing means 6 at every fixed time, for example.

Sixth Embodiment

Figure 13:
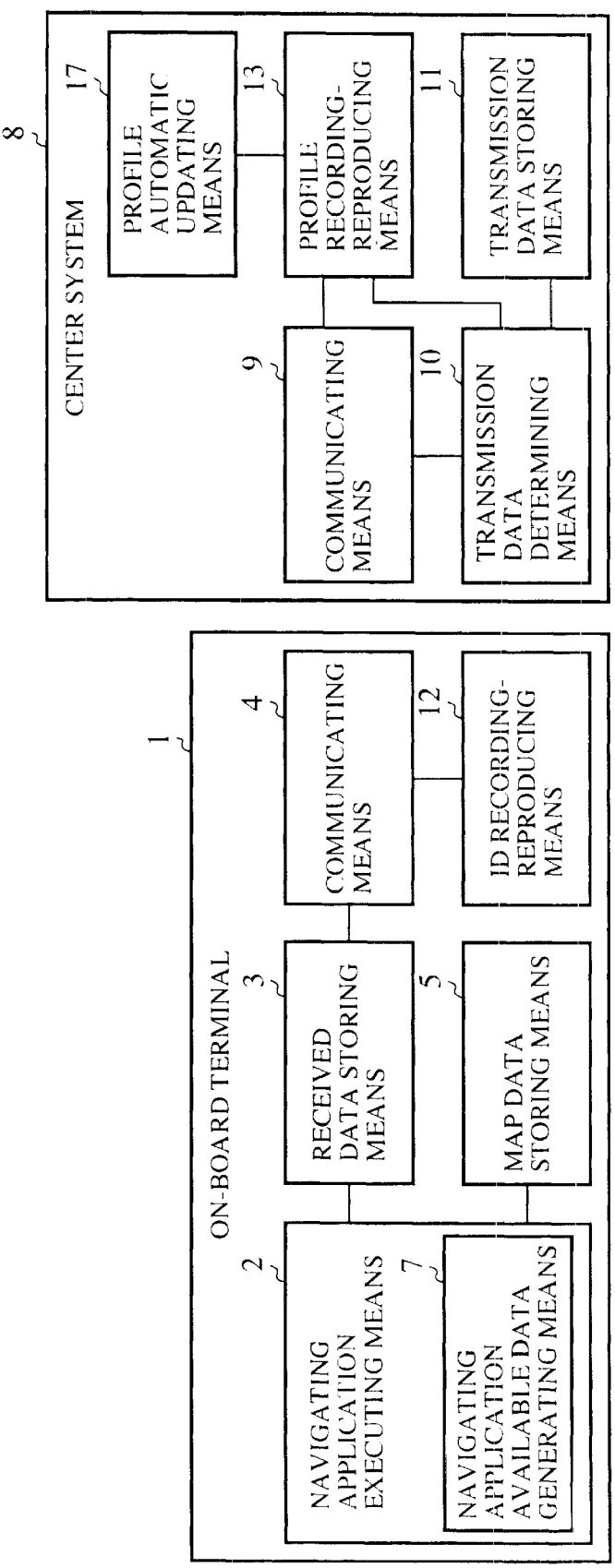
FIG. 13 is a block diagram showing a configuration of a navigation system according to a sixth embodiment of the invention.

FIG. 13 is a block diagram showing the configuration of a navigation system according to the sixth embodiment of the invention. In FIG. 13, a reference numeral 17 denotes automatic profile updating means (automatic unique information updating means) provided in the center system 8. Other components that are the same as those of the second embodiment described above with reference to FIG. 8, are denoted by the same reference numerals, and thus description thereof will be omitted.

Change detecting means (not shown) is provided in the center system 8 to detect information changed with an elapse of time in the on-board terminal side 1 at every fixed time. For example, the communicating means 9 includes time measuring means provided to measure fixed time, and comparing means provided to compare information acquired before the fixed time with present information.

Next, the operation of the sixth embodiment will be described.

The automatic profile updating means 17 detects information changed with an elapse of time in the on-board terminal 1 side by the change detecting means at every fixed time, and automatically updates unique information recorded by the profile recording-reproducing means 13 depending on what kind of result is obtained. Unique information to be changed may be one selected from dynamic vehicle information, operation history, and so on, like those shown in FIG. 2.

As mentioned above, according to the sixth embodiment, when any change of information in an optional on-board navigation terminal is detected, it is possible to automatically update the unique information of the on-board navigation terminal concerning detection, recorded by the profile recording-reproducing means 13.

In other words, according to the sixth embodiment, when any change is made in a vehicle traveling distance or traveling history, dynamic vehicle information recorded by the profile recording-reproducing means 13 at every fixed time can be automatically updated, for example.

Further, according to the sixth embodiment, when any change is made in the operation history of the on-board terminal 1, it is possible to automatically update, operation history information recorded by the profile recording-reproducing means 13 at every fixed time, for example.

Seventh Embodiment

Figure 14:
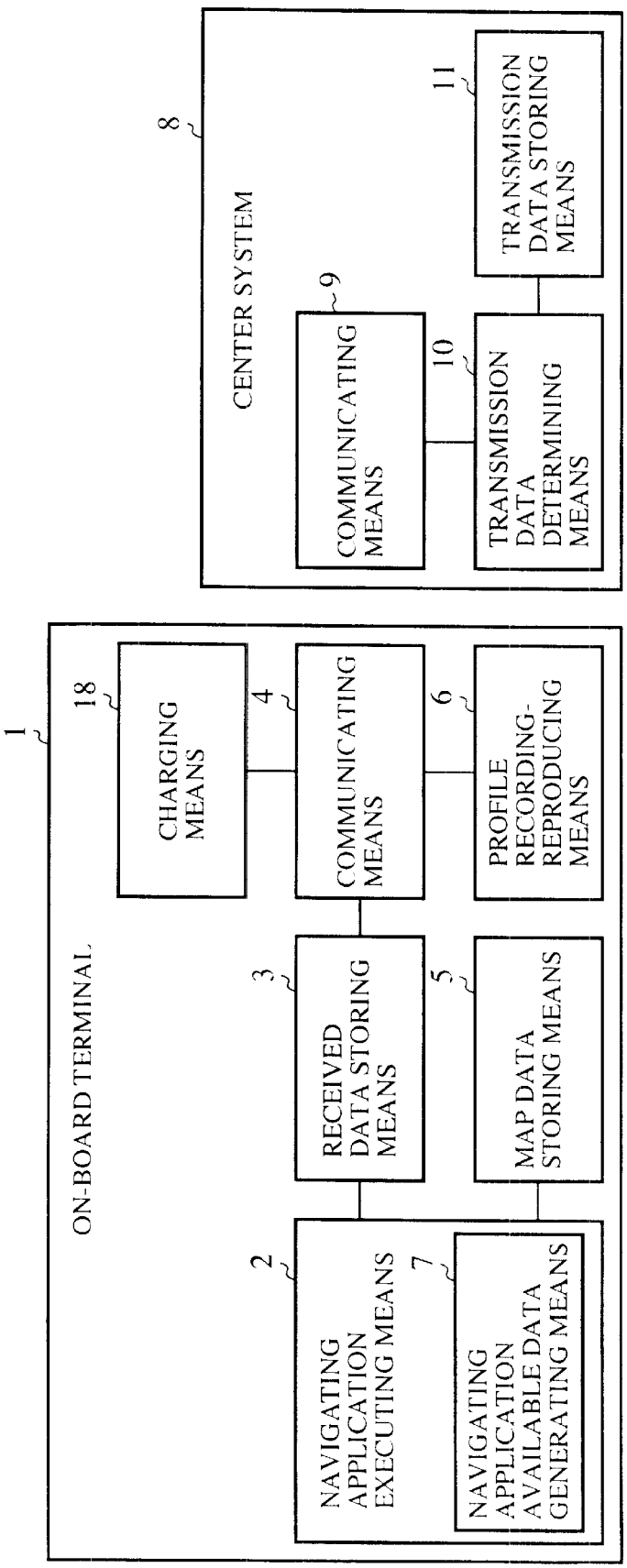
FIG. 14 is a block diagram showing a configuration of a navigation system according to a seventh embodiment of the invention.

FIG. 14 is a block diagram showing the configuration of a navigation system according to the seventh embodiment of the invention. In FIG. 14, a reference numeral 18 denotes charging means provided in the on-board terminal 1. Other components that are the same as those of the first embodiment described above with reference to FIG. 1, are denoted by the same reference numerals, thus description thereof will be omitted.

Next, the operation of the seventh embodiment will be described.

The charging means 18 causes the communicating means 4 to transmit or receive charging information generated based on a service rendered from the center system 8. For example, upon reception of charging amount information from the center system 8, a user identification number contained in personal information recorded by the profile recording-reproducing means, or an identification number entered by an operation, amount information, and automatic transfer information containing the account number of the financial institution of the center system 8 are transmitted to user's financial institution.

As mentioned above, according to the seventh embodiment, it is possible to automatically make a charge for the service rendered from the center system 8.

Eighth Embodiment

Figure 15:
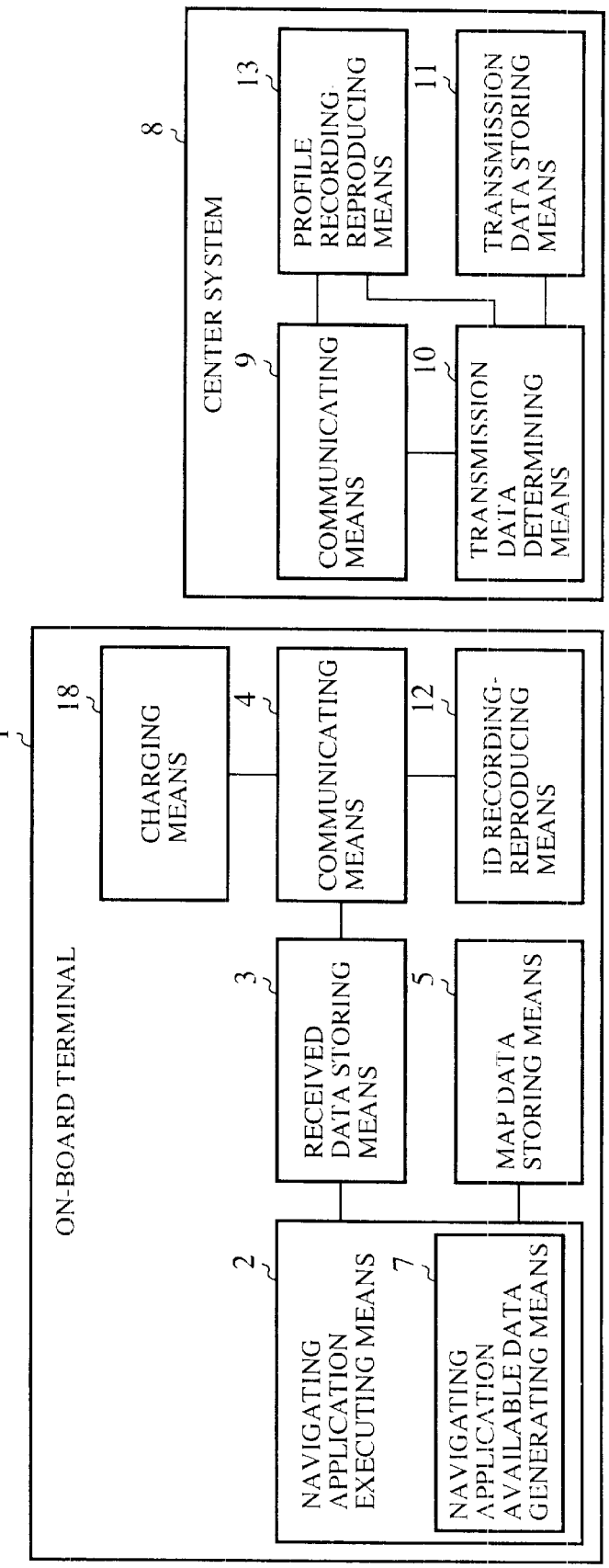
FIG. 15 is a block diagram showing a configuration of a navigation system according to an eighth embodiment of the invention.

FIG. 15 is a block diagram showing the configuration of a navigation system according to the eight embodiment of the invention. In FIG. 15, a reference numeral 18 denotes charging means provided in the on-board terminal 1. Other components that are the same as those of the second embodiment described above with reference to FIG. 8, are denoted by the same reference numerals, and thus description thereof will be omitted.

Next, the operation of the eighth embodiment will be described.

The charging means 18 causes the communicating means 4 to transmit or receive charging information generated based on a service offered from the center system 8. For example, upon reception of charging amount information from the center system 8, a personal identification number recorded by the ID recording-reproducing means 12 or a personal identification number entered by an operation, amount information, and automatic transfer information containing the account number of the financial institution of the center system 8 are transmitted to user's financial institution.

As mentioned above, according to the eighth embodiment, it is possible to automatically make a charge for the service offered from the center system 8.

Ninth Embodiment

The configuration of a navigation system according to the ninth embodiment is the same as that of the seventh embodiment shown in FIG. 14 or the eighth embodiment shown in FIG. 15. Thus, the configuration of the ninth embodiment is not shown, and description thereof will be omitted. Charging means in the ninth embodiment includes prepaid card driving means.

Next, the operation of the ninth embodiment will be described.

Upon reception of charging amount information generated based on a service rendered from the center system 8 through the communicating means 4, the prepaid card driving means drives a prepaid card in which the amount information of indicating that the amount is prepaid to the center system 8 is recorded, and subtracts charging amount information from the recorded amount information.

As mentioned above, according to the ninth embodiment, it is possible to reduce costs necessary for the collection of a charge made based on the service rendered from the center system 8.

Tenth Embodiment

Figure 16:
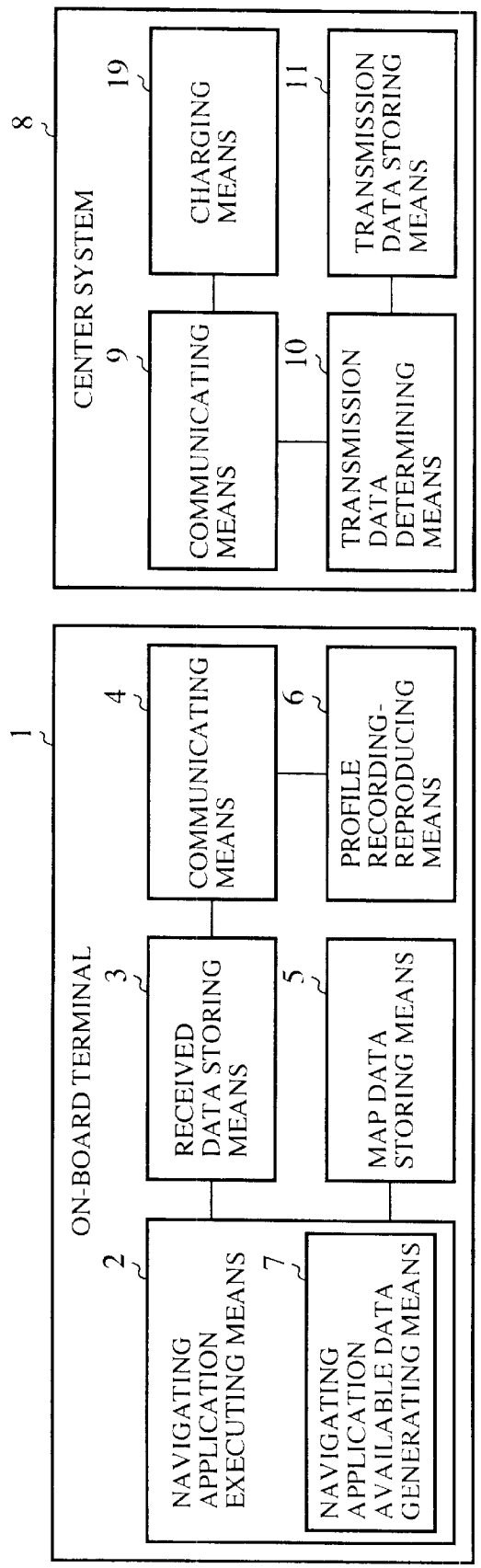
FIG. 16 is a block diagram showing a configuration of a navigation system according to a tenth embodiment of the invention.

FIG. 16 is a block diagram showing the configuration of a navigation system according to the tenth embodiment of the invention. In FIG. 16, a reference numeral 19 denotes charging means provided in the center system 8. Other components that are the same as those of the first embodiment described above with reference to FIG. 1, are denoted by the same reference numerals, and thus description thereof will be omitted.

Next, the operation of the tenth embodiment will be described.

The charging means 19 causes the communicating means 9 to transmit or receive charging information generated based on a service offered to the on-board terminal 1. For example, charging amount information indicative of charging amount is transmitted to the on-board terminal 1 and, based on payment agreement information containing the account number of user's financial institution and user's personal information, received from the on-board terminal 1, automatic transfer information containing amount information and the account number of the financial institution of the center system 8 is transmitted to user's financial institution.

As mentioned above, according to the tenth embodiment, it is possible to automatically make a charge for the service rendered to the on-board terminal 1.

Eleventh Embodiment

Figure 17:
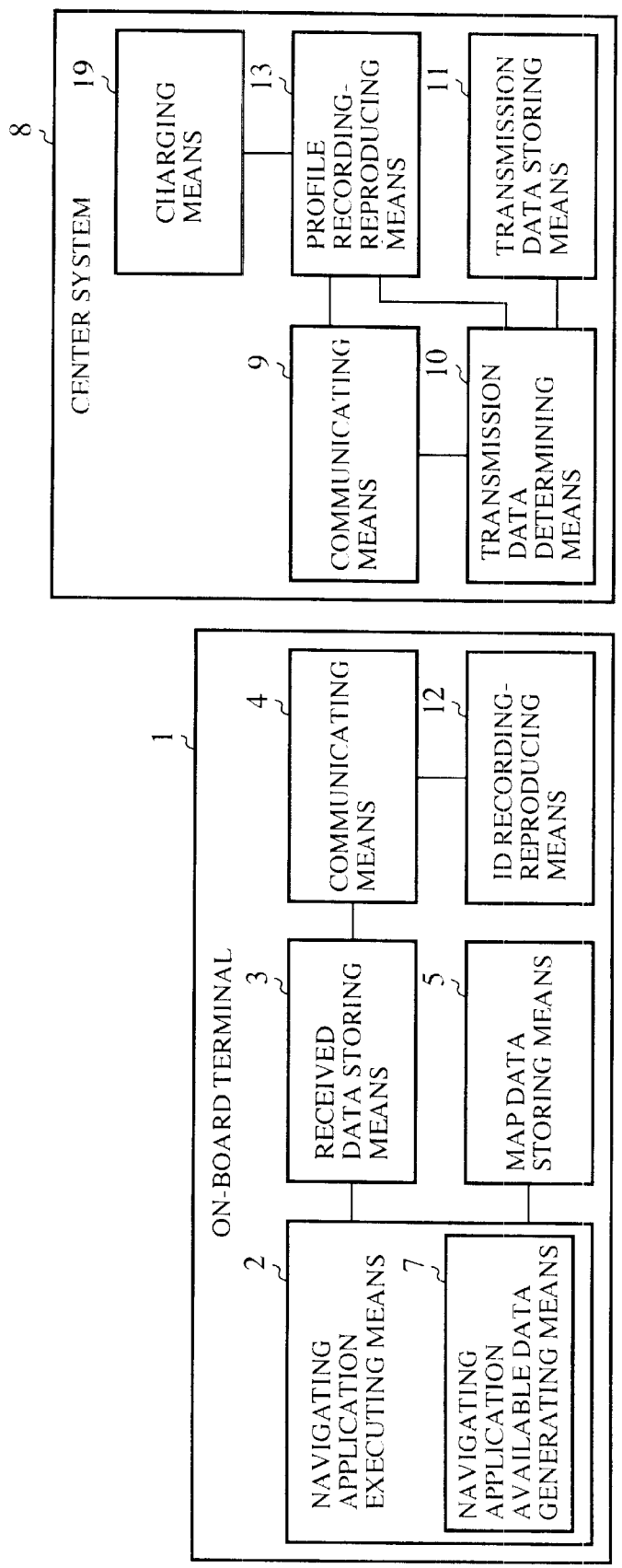
FIG. 17 is a block diagram showing a configuration of a navigation system according to an eleventh embodiment of the invention.

FIG. 17 is a block diagram showing the configuration of a navigation system according to the eleventh embodiment of the invention. In FIG. 17, a reference numeral 19 denotes charging means provided in the center system 8. Other components that are the same as those of the second embodiment described above with reference to FIG. 8, are denoted by the same reference numerals, and thus description thereof will be omitted.

Next, the operation of the eleventh embodiment will be described.

The charging means 19 causes the communicating means 9 to transmit or receive charging information generated based on a service rendered to the on-board terminal 1. For example, charging amount information indicative of a generated charging amount is transmitted to the on-board terminal 1. Based on payment agreement information containing user ID and the account number of user's financial institution, received from the on-board terminal 1, user personal information corresponding to ID is reproduced from the personal information of the ID recording-reproducing means 12, and automatic transfer information containing amount information and the account number of the financial institution of the center system 8 is transmitted to user's financial institution.

As mentioned above, according to the eleventh embodiment, it is possible to automatically make a charge for the service offered to the on-board terminal 1.

Twelfth Embodiment

The configuration of a navigation system according to the twelfth embodiment is the same as that of the tenth embodiment shown in FIG. 16 or the eleventh embodiment shown in FIG. 17. Thus, the configuration of the twelfth embodiment is not shown, and description thereof will be omitted.

Next, the operation of the twelfth embodiment will be described.

The charging means 19 of the center system 8 makes no charge till a predetermined condition is met after the start of the service rendered to the on-board terminal 1. For example, services will be rendered free of charge till a time comes to a prescribed one after the start of the service, a service reaches to a prescribed number after the start of the service, or data amounts to a prescribed amounts after the start of the service.

As mentioned above, according to the twelfth embodiment, since services are rendered free of charge till the predetermined condition is met after the start of the service, it is possible to improve convenience for the user, and promote the popularization of navigation services.

In each of the foregoing embodiments, different communication systems may be used for transmission from the on-board terminal 1 to the center system 8, and transmission from the center system 8 to the on-board terminal 1. For example, a digital broadcasting system using a satellite or a ground wave may be employed for transmission from the center system 8.

In each of the foregoing embodiments, one on-board terminal may communicate with a plurality of center systems for data reception. Alternatively, a plurality of on-board terminals may communicate with one center system for data reception.

As apparent from the foregoing, the present invention is advantageous in the following respects. The on-board navigation terminal of the invention comprises map data storing means for storing map data; communicating means for performing communications with an external navigation controller; received data storing means for storing received data containing relevant information concerning a navigating application transmitted from the navigation controller and received through the communicating means, based on unique information transmitted through the communicating means to the navigation controller; and data generating means for generating available data based on the map data stored in the map data storing means and the received data stored in the received data storing means. Thus, by transmitting or receiving only necessary relevant information between the transmitting and receiving sides of the relevant information concerning the navigating application, it is possible to shorten communication time, and reduce communication costs and the quantity of data held in the on-board terminal side.

According to the on-board navigation terminal of the invention, unique information recording-reproducing means is provided for recording or reproducing unique information specifying a content of the relevant information transmitted from the navigation controller. Thus, only by transmitting the unique information from the on-board navigation terminal to the navigation controller, it is possible to easily obtain specified relevant information.

According to the on-board navigation terminal of the invention, unique information recording-changing means is provided for changing the unique information recorded by the unique information recording-reproducing means depending on what kind of change is made therein. Thus, when any change is made in the unique information, it is possible to easily change the unique information recorded by the unique information recording-reproducing means depending on what kind of change is made therein.

According to the on-board navigation terminal of the invention, the unique information recording-changing means changes personal information of a user using the navigating application. Thus, when any change is made in the personal information such as user's address or the like, it is possible to easily change the personal information recorded by the unique information recording-reproducing means depending on what kind of change is made therein.

According to the on-board navigation terminal of the invention, the unique information recording-changing means changes vehicle information unique to a vehicle. Thus, when any change is made in the registration number or the vehicle type unique to the vehicle, it is possible to easily change the static vehicle information recorded by the unique information recording-reproducing means depending on what kind of change is made therein.

According to the on-board navigation terminal of the invention, the unique information recording-changing means changes terminal information indicative of a type of the terminal itself. Thus, when any change is made in the terminal information, when a display replacement requires a change of a screen size, a CPU or the like, for example, it is possible to easily change the terminal information recorded by the unique information recording-reproducing means depending on what kind of change is made therein.

According to the on-board navigation terminal of the invention, the unique information recording-changing means changes service information concerning a service of the navigating application. Thus, when any change is made in the service information such as a category of business, substance of duties and responsibilities or the like, it is possible to easily change the service information recorded by the unique information recording-reproducing means.

According to the on-board navigation terminal of the invention, automatic unique information updating means is provided for automatically updating the unique information recorded by the unique information recording-reproducing means. Thus, when any change is made in the unique information with an elapse of time, it is possible to automatically update the dynamic vehicle information recorded by the unique information recording-reproducing means.

According to the on-board navigation terminal of the invention, the automatic unique information updating means updates vehicle information indicative of a traveling state of a vehicle. Thus, when any change is made in the vehicle traveling distance or the traveling state, it is possible to automatically update, the dynamic vehicle information recorded by the unique information recording-reproducing means at every fixed time, for example.

According to the on-board navigation terminal of the invention, the automatic unique information updating means updates operation history information indicative of an operation history of the on-board navigation terminal. Thus, when any change is made in the operation history of the on-board navigation terminal, it is possible to automatically update, the operation history information recorded by the unique information recording-reproducing means at every fixed time, for example.

According to the on-board navigation terminal of the invention comprises map data storing means for storing map data; communicating means for performing communications with an external navigation controller; identification information recording-reproducing means for recording or reproducing identification information for identifying unique information recorded or reproduced by unique information recording-reproducing means provided in the navigation controller; received data storing means for receiving data from the navigation controller, containing relevant information concerning a content specified by the unique information identified based on the identification information reproduced by the identification information recording-reproducing means and transmitted through communicating means to the navigation controller; and data generating means for generating available data based on the map data stored in the map data storing means, and the received data stored in the received data storing means. Thus, it is possible to easily and quickly obtain specified relevant information by transmitting identification information consisting of a very few data from the on-board navigation terminal to the navigation controller.

According to the on-board navigation terminal of the invention, the received data storing means stores received data containing, as relevant information, difference information indicative of a difference between a conventional map and a newly changed latest map. Thus, since the necessary information is difference information indicative of a difference between the conventional map and the newly changed latest map, it is not necessary to transmit all the latest map data containing an enormous quantity of data. As a result, it is possible to shorten communication time, and greatly reduce communication costs, and the quantity of data held in the on-board terminal side.

According to the on-board navigation terminal of the invention, the received data storing means stores received data containing specific relevant information corresponding to the unique information. Thus, since the necessary relevant information is relevant information corresponding to the unique information of the on-board navigation terminal side, it is not necessary to transmit or receive any wasteful relevant information, which is never used. As a result, it is possible to shorten communication time, and reduce communication costs, and the quantity of data held in the on-board terminal side to a minimum.

According to the on-board navigation terminal of the invention, the received data storing means stores received data containing, as relevant information, additional information added to a navigating application. Thus, since the necessary relevant information is additional information added to the navigating application, it is possible to shorten communication time, reduce communication costs and the quantity of data held in the on-board terminal side, and enhance applicability of application.

According to the on-board navigation terminal of the invention, charging means is provided for receiving or transmitting charging information concerning a service rendered from the navigation controller through the communicating means. Thus, it is possible to automatically make a charge for thee service rendered from the navigation controller.

According to the on-board navigation terminal of the invention, charging means is provided with prepaid card driving means for driving a loaded prepaid card. Thus, it is possible to reduce costs necessary for the collection of a charge made based on the service offered from the navigation controller.

According to the navigation controller of the invention comprises communicating means for performing communications with an external on-board navigation terminal; transmission data storing means for storing a plurality of transmission data containing a plurality of relevant information concerning a navigating application used in the on-board navigation terminal; and transmission data determining means for determining transmission data containing relevant information having a content corresponding to unique information, among the plurality of transmission data stored in the transmission data storing means, when the unique information or identification information specifying the unique data is received through the communicating means from the on-board navigation terminal, and transmitting the determined transmission data to the on-board navigation terminal through the communicating means. Thus, by transmitting or receiving only the necessary relevant information between the transmitting and receiving sides of the relevant information concerning the navigating application, it is possible to shorten communication time, and reduce communication costs, and the quantity of data held in the on-board terminal side.

According to the navigation controller of the invention, unique information recording-reproducing means is provided for recording or reproducing the unique information specifying the content of the relevant information. Thus, by centrally managing unique information among a plurality of users, it is possible to make effective use of system resources, and reduce the quantity of data held in the on-board navigation terminal side.

According to the navigation controller of the invention, unique information recording-changing means is provided for changing the unique information recorded by the unique information recording-reproducing means depending on what kind of change is made therein. Thus, when any notification of change is given in the unique information, it is possible to easily change the personal information recorded by the unique information recording-reproducing means depending on what kind of change is made therein.

According to the navigation controller of the invention, the unique information recording-changing means changes personal information of a user corresponding to received identification information. Thus, when any notification of change is given in the personal information such as user's address or the like, it is possible to easily change the personal information recorded by the unique information recording-reproducing means depending on what kind of change is made therein.

According to the navigation controller of the invention, the unique information recording-changing means changes vehicle information unique to a vehicle in which an on-board navigation terminal corresponding to received identification information is mounted. Thus, when any notification of change is given in a registration number of a vehicle type unique to the vehicle, it is possible to easily change the static vehicle information recorded by the unique information recording-reproducing means depending on what kind of change is made therein.

According to the navigation controller of the invention, the unique information recording-changing means changes terminal information indicative of types of a plurality of on-board navigation terminals. Thus, when any notification of change is given in the terminal information, e.g., when the display replacement of the on-board navigation terminal requires a change of a screen size, a CPU or the like, it is possible to easily change the terminal information recorded by the unique information recording-reproducing means depending on what kind of change is made therein.

According to the navigation controller of the invention, the unique information recording-changing means changes service information concerning a plurality of services in the navigating application. Thus, when any notification of change is given in service information such as a category of business, substance of duties and responsibilities or the like, it is possible to easily change the service information recorded by the unique information recording-reproducing means depending on what kind of change is made therein.

According to the navigation controller of the invention, change detecting means is for detecting information changed with an elapse of time in the on-board navigation terminal side at every fixed time; and automatic unique information updating means is provided for automatically updating the unique information recorded by the unique information recording-reproducing means depending on the change detected by the change detecting means. Thus, when any change of the information in an optional on-board navigation terminal is detected, it is possible to automatically update the unique information of the on-board navigation terminal relevant to detection, recorded by the unique information recording-reproducing means.

According to the navigation controller of the invention, the automatic unique information updating means updates vehicle information indicative of a traveling state of a vehicle in which an on-board navigation terminal corresponding to received identification information is mounted. Thus, when any change is made in the vehicle traveling distance or traveling history, it is possible to automatically update, the dynamic vehicle information recorded by the unique information recording-reproducing means at every fixed time, for example.

According to the navigation controller of the invention, the automatic unique information updating means updates operation history information indicative of an operation history of an on-board navigation terminal corresponding to received identification information. Thus, when any change is made in the operation history of the vehicle, it is possible to automatically update, the operation history information recorded by the unique information recording-reproducing means at every fixed time, for example.

According to the navigation controller of the invention, the transmission data storing means stores transmission data containing, as relevant information, difference information indicative of a difference between a conventional map and a newly changed latest map. Thus, since the necessary relevant information is difference information indicative of the difference between the conventional map and the newly changed latest map, it is not necessary to transmit or receive all the latest map data containing an enormous quantity of data. As a result, it is possible to shorten communication time, and greatly reduce communication costs, and the quantity of data held in the on-board terminal side.

According to the navigation controller of the invention, the transmission data storing means stores transmission data containing specific relevant information corresponding to the unique information. Thus, since the necessary information is relevant information corresponding to the unique information of the on-board navigation terminal side, it is not necessary to transmit or receive any wasteful relevant information, which is never used. As a result, it is possible to shorten communication time, and reduce communication costs, and the quantity of data held in the on-board terminal side to a minimum.

According to the navigation controller of the invention, the transmission data storing means stores transmission data containing, as relevant information, additional information added to the navigating application. Thus, since the necessary relevant information is the additional information added to the navigating application, it is possible to shorten communication time, reduce communication costs, and the quantity of data held in the on-board terminal side, and enhance applicability of application.

According to the navigation controller of the invention, charging means is provided for transmitting or receiving charging information concerning a service rendered to the on-board navigation terminal through the communicating means. Thus, it is possible to automatically make a charge for the service rendered to the on-board navigation terminal.

According to the navigation controller of the invention, the charging means makes no charge till a predetermined condition is met after a start of the service offered to the on-board navigation terminal. Thus, by offering services free of charge till the predetermined condition is met after the start of the service, it is possible to improve convenience for the user, and promote the popularization of navigation services.

While, in the preferred embodiments of the invention, the on-board navigation terminal capable of shortening communication time, and reducing communication costs and the quantity of data held in the on-board navigation terminal side by transferring and receiving sides, it should be understood by those skilled in the art that various modifications and changes may be made without departing from the sprit and scope of the invention.

Also, it should be noted that the invention meets all the objects mentioned above and also has the advantages of wide commercial utility, and that the invention has been set forth for purposes of illustration only and not of limitation. That is, the invention is limited only by the following claims which follow. Consequently, reference should be made to the following claims in determining the full scope of the invention.

What is claimed is:

1. An on-board navigation terminal comprising:
   map data storing means for storing map data;
   communication means for transmitting a user profile to an external navigation controller, and for receiving necessary navigation application information corresponding to the user profile;
   received data storing means for storing received data containing the necessary navigation application information, transmitted from the external navigation controller; and
   data generating means for generating available data based on the map data stored in said map data storing means and the received data stored in said received data storing means.

2. The on-board navigation terminal according to claim 1, further comprising profile recording-reproducing means for recording or reproducing a user profile.

3. The on-board navigation terminal according to claim 2, further comprising profile recording-changing means for altering the user profile.

4. The on-board navigation terminal according to claim 2, further comprising automatic information updating means for automatically updating the user profile recorded by said profile recording reproducing means.

5. An on-board navigation terminal comprising:
   map data storing means for storing map data;
   communication means for transmitting a user profile to an external navigation controller, and for receiving necessary navigation application information corresponding to the user profile;
   identification information recording-reproducing means for recording or reproducing identification information for specifying a user profile recorded or reproduced by profile recording-reproducing means provided in the external navigation controller;
   received data storing means for storing received data containing the necessary navigation application information transmitted from the navigation controller; and
   data generating means for generating available data based on the map data stored in said map data storing means, and the received data stored in said received data storing means.

6. The on-board navigation terminal according to claim 5, wherein said received data storing means stores received data containing, as necessary navigation application information, difference information indicative of a difference between a stored map version and a new map version.

7. The on-board navigation terminal according to claim 5, wherein said received data storing means stores received data containing custom information corresponding to the user profile.

8. The on-board navigation terminal according to claim 5, wherein said received data storing means stores received data containing, as necessary navigation application information, additional information added to a navigating application.

9. The on-board navigation terminal according to claim 5, further comprising charging means for receiving or transmitting charging information concerning a service rendered by the external navigation controller through said communicating means.

10. The on-board navigation terminal according to claim 9, wherein said charging means includes prepaid card driving means for driving a prepaid card.

11. A navigation controller comprising:
    communicating means for receiving a user profile from an on-board navigation terminal, and for transmitting necessary navigation application information corresponding to the user profile;
    transmission data storing means for storing a plurality of transmission data containing a plurality of navigation application information concerning a navigating application utilized in the on-board navigation terminal; and
    transmission data determining means for determining, based on a user profile, transmission data that is necessary navigation application information, from among the plurality of transmission data stored in said transmission data storing means, when the user profile or identification information specifying the user profile is received through said communicating means from the on-board navigation terminal, and for transmitting the transmission data determined to be necessary navigation application information to the on-board navigation terminal through the communicating means.

12. The navigation controller according to claim 11, further comprising profile recording-reproducing means for recording or reproducing the user profile.

13. The navigation controller according to claim 12, further comprising profile recording-changing means for altering the user profile.

14. The navigation controller according to claim 12, further comprising:
    change detecting means for detecting information changed with an elapse of time in the on-board navigation terminal side at fixed duration time intervals; and
    automatic profile updating means for automatically updating the user profile recorded by said profile recording-reproducing means if a change is detected by said change detecting means.

15. The navigation controller according to claim 11, wherein said transmission data storing means stores transmission data containing, as necessary navigation application information, difference information indicative of a difference between a stored map version and a new map version.

16. The navigation controller according to claim 11, wherein said transmission data storing means stores transmission data containing custom information corresponding to the user profile.

17. The navigation controller according to claim 11, wherein said transmission data storing means stores transmission data containing, as necessary navigation application information, additional information added to a navigating application.

18. The navigation controller according to claim 11, further comprising charging means for transmitting or receiving charging information concerning a service rendered to the on-board navigation terminal through said communicating means.

19. The navigation controller according to claim 18, wherein said charging means does not make a charge until a condition is met after starting of the service rendered to the on-board navigation terminal.

* * * * *